(12) United States Patent
Yamamoto et al.

(10) Patent No.: US 9,577,246 B2
(45) Date of Patent: Feb. 21, 2017

(54) NEGATIVE ELECTRODE ACTIVE MATERIAL, NEGATIVE ELECTRODE FOR NONAQUEOUS ELECTROLYTE SECONDARY BATTERY, AND NONAQUEOUS ELECTROLYTE SECONDARY BATTERY

(71) Applicant: KABUSHIKI KAISHA TOYOTA JIDOSHOKKI, Kariya-shi, Aichi-ken (JP)

(72) Inventors: Megumi Yamamoto, Kariya (JP); Hideaki Shinoda, Kariya (JP); Hirokuni Akiyama, Kariya (JP); Manabu Miyoshi, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 72 days.

(21) Appl. No.: 14/186,201

(22) Filed: Feb. 21, 2014

(65) Prior Publication Data
US 2014/0242469 A1 Aug. 28, 2014

(30) Foreign Application Priority Data
Feb. 22, 2013 (JP) .................................. 2013-033299

(51) Int. Cl.
*H01M 4/134* (2010.01)
*H01M 4/36* (2006.01)
(Continued)

(52) U.S. Cl.
CPC ............... *H01M 4/364* (2013.01); *H01M 4/48* (2013.01); *H01M 4/583* (2013.01)

(58) Field of Classification Search
CPC .............................. H01M 4/133; H01M 4/134
See application file for complete search history.

(56) References Cited

U.S. PATENT DOCUMENTS

2003/0215711 A1* 11/2003 Aramata et al. ........... 429/218.1
2004/0115535 A1* 6/2004 Morita et al. .............. 429/231.8
(Continued)

FOREIGN PATENT DOCUMENTS

JP 2004-185984 A 7/2004
JP 2008010316 A 1/2008
(Continued)

OTHER PUBLICATIONS

Communication dated Dec. 9, 2014 from the Japanese Patent Office in counterpart application No. 2013-033299.

*Primary Examiner* — Stewart Fraser
*Assistant Examiner* — Olatunji Godo
(74) *Attorney, Agent, or Firm* — Sughrue Mion, PLLC

(57) ABSTRACT

Provided is a negative electrode active material containing $SiO_x$ and carbonaceous particles containing graphite and having both good discharge capacity and good electric conductivity. Also provided is a negative electrode using the negative electrode active material and a nonaqueous electrolyte secondary battery. When the carbonaceous particles have an average particle diameter $D_{50}$ of $\alpha$ (μm) and a BET specific surface area of $\beta$ (m²/g), the $\alpha$ and the $\beta$ satisfy the following Formulae (1) and (2).

$$\beta \leq -(12/18)\alpha + 12 \quad (1)$$

$$5 \leq \alpha \leq 15 \quad (2).$$

12 Claims, 2 Drawing Sheets

(51) Int. Cl.
*H01M 4/48* (2010.01)
*H01M 4/583* (2010.01)

(56) References Cited

U.S. PATENT DOCUMENTS

2005/0233213 A1* 10/2005 Lee .................. H01M 4/13
 429/218.1
2012/0052386 A1* 3/2012 Ookita .................. H01M 4/13
 429/215
2012/0288766 A1* 11/2012 Lee et al. .................. 429/223

FOREIGN PATENT DOCUMENTS

| JP | 2008-532912 A | 8/2008 |
| JP | 2009054552 A | 3/2009 |
| JP | 2009-238663 A | 10/2009 |
| JP | 2010-034024 A | 2/2010 |
| JP | 2012-169300 A | 9/2012 |
| JP | 2012-221681 A | 11/2012 |
| WO | 2011027503 A1 | 3/2011 |

* cited by examiner

NEGATIVE ELECTRODE ACTIVE MATERIAL, NEGATIVE ELECTRODE FOR NONAQUEOUS ELECTROLYTE SECONDARY BATTERY, AND NONAQUEOUS ELECTROLYTE SECONDARY BATTERY

FIELD OF THE INVENTION

The present invention relates to a negative electrode active material usable in a nonaqueous electrolyte secondary battery, a negative electrode using the negative electrode active material, and a nonaqueous electrolyte secondary battery using the negative electrode.

BACKGROUND OF THE INVENTION

A variety of nonaqueous electrolyte secondary batteries have been used in recent years. For example, lithium ion secondary batteries, which are one kind of nonaqueous electrolyte secondary batteries have been widely used as secondary batteries of cell phones, notebook computers and so on owing to their compact size and large capacity. Lately, it also has been proposed to use nonaqueous electrolyte secondary batteries as batteries of electric vehicles, hybrid vehicles, and so on.

A nonaqueous electrolyte secondary battery has an active material capable of absorbing and releasing a charge carrier such as lithium (Li) at each of a positive electrode and a negative electrode. The nonaqueous electrolyte secondary battery works by moving the charge carrier between both the electrodes.

Carbon materials having multi-layered structures are mainly used as negative electrode active materials for nonaqueous electrolyte secondary batteries. Use of this kind of carbon material as a negative electrode active material can suppress a decrease in discharge capacity after repeated electric charge and discharge, and accordingly can improve cycle characteristics of a nonaqueous electrolyte secondary battery. However, such a nonaqueous electrolyte secondary battery having a negative electrode active material constituted only by this kind of carbon material has a problem of poor initial capacity (energy density).

In order to enhance the initial capacity of the nonaqueous electrolyte secondary battery, it has been proposed to employ an element which can be alloyed with a charge carrier and has a larger theoretical capacity than the carbon materials, as the negative electrode active material. Since silicon (Si) is an element which can be alloyed with a charge carrier such as Li and has a larger theoretical capacity than the carbon materials and other elements (e.g., tin and germanium), silicon is believed to be useful as the negative electrode active material for a nonaqueous electrolyte secondary battery. That is to say, a nonaqueous electrolyte secondary battery having a higher capacity can be obtained by using Si as the negative electrode active material than by using the carbon materials.

On the other hand, Si makes a great volume change associated with Li absorption and release in electric charge and discharge. This volume change causes Si to be changed into fine powder and drop or peel off from a current collector, so there arises a problem that such a battery has a short charge and discharge cycle life. This volume change associated with Li absorption and release in charge and discharge can be suppressed by using silicon oxide as the negative electrode active material instead of using elemental silicon as the negative electrode active material.

For example, use of silicon oxide ($SiO_x$; about $0.5 \leq x \leq 1.5$) as the negative electrode active material is being studied. $SiO_x$ is a generic chemical name of amorphous silicon oxide obtained from elemental silicon (Si) and silicon dioxide ($SiO_2$) as raw materials. It is known that when subjected to heat treatment, $SiO_x$ decomposes into silicon (Si) and silicon dioxide ($SiO_2$). This is called a disproportionation reaction and if homogeneous solid silicon monoxide (SiO) having a ratio of Si to O of approximately 1:1 is subjected to heat treatment, the silicon monoxide is separated into two phases of silicon (Si) phase and silicon dioxide ($SiO_2$) phase by an internal reaction in the solid. The Si phase obtained by the separation is very fine and dispersed in the $SiO_2$ phase. Moreover, the $SiO_2$ phase covering the Si phase serves to suppress decomposition of an electrolytic solution. Therefore, a nonaqueous electrolyte secondary battery using a negative electrode active material comprising $SiO_x$ which has been decomposed into Si and $SiO_2$ has good cycle characteristics.

By the way, $SiO_x$ has relatively poor electric conductivity. Accordingly, a negative electrode including $SiO_x$ as the negative electrode active material also has poor electric conductivity. Therefore, it is desired to improve electric conductivity of the negative electrode containing $SiO_x$. As a method for improving electric conductivity of the negative electrode, it is considered to employ a negative electrode active material having good electric conductivity in combination with $SiO_x$.

Graphite is known as a negative electrode active material having good electric conductivity. Graphite is generally used in a form of particles, and a coating layer such as a carbon coat is formed on a surface of graphite. Particles of this kind containing graphite are called carbonaceous particles. The carbonaceous particles of the present invention may have a coating layer and may be constituted only by graphite and have no coating layer.

PTL 1 mentions that a carbon material such as graphite can be suitably used as a negative electrode active material. PTL 1 describes that a carbon material for a negative electrode active material having a small particle diameter (e.g., an average particle diameter of 15 μm or less) are preferred. However, it has been difficult to attain both capacity enhancement of a battery and an improvement in electric conductivity of a negative electrode by simply selecting graphite having a small particle diameter.

CITATION LIST

Patent Literature

[PTL 1] Japanese Unexamined Patent Publication No. 2009-238663

SUMMARY OF THE INVENTION

Technical Problem

The present invention has been made in view of the above circumstances. It is an object of the present invention to provide a negative electrode active material which contains $SiO_x$ and carbonaceous particles containing graphite and can attain both capacity enhancement of a nonaqueous electrolyte secondary battery and an improvement in electric conductivity of a negative electrode.

Solution to Problem

In general, as particles have a smaller diameter, the particles have a larger specific surface area. Therefore, when carbonaceous particles having a small particle diameter are selected as a negative electrode active material, carbonaceous particles having a large specific surface area are to be selected at the same time. However, as mentioned later, when the carbonaceous particles having a large specific surface area are employed as a negative electrode active material, it is difficult to attain both capacity enhancement of a nonaqueous electrolyte secondary battery and an improvement in electric conductivity of a negative electrode. As a result of earnest studies, the present inventors have found that a negative electrode active material which can attain both capacity enhancement of a nonaqueous electrolyte secondary battery and an improvement in electric conductivity of a negative electrode can be obtained by causing an average particle diameter ($D_{50}$) and a specific surface area of carbonaceous particles to have a particular relation.

That is to say, a negative electrode active material of the present invention, which solves the above problem, contains a mixture of silicon oxide expressed by $SiO_x$ ($0.3 \leq x \leq 1.6$) and carbonaceous particles containing graphite, and when the carbonaceous particles have an average particle diameter $D_{50}$ of $\alpha$ (µm) and a BET specific surface area of $\beta$ (m$^2$/g), the $\alpha$ and the $\beta$ satisfy the following Formulae (1) and (2).

$$\beta \leq -(12/18)\alpha + 12 \quad (1)$$

$$5 \leq \alpha \leq 15 \quad (2)$$

Moreover, a negative electrode for a nonaqueous electrolyte secondary battery according to the present invention, which solves the above problem, has the aforementioned negative electrode active material of the present invention.

Furthermore, a nonaqueous electrolyte secondary battery according to the present invention has the aforementioned negative electrode.

Advantageous Effects of the Invention

The negative electrode active material of the present invention can attain both capacity enhancement of a nonaqueous electrolyte secondary battery and an improvement in electric conductivity of a negative electrode.

BRIEF DESCRIPTION OF THE DRAWINGS

The above and other aspects, features and other advantageous effects of the present invention will be more clearly understood from the following detailed description taken in conjunction with the accompanying drawings, in which.

DETAILED DESCRIPTION OF THE INVENTION

Figure 1:
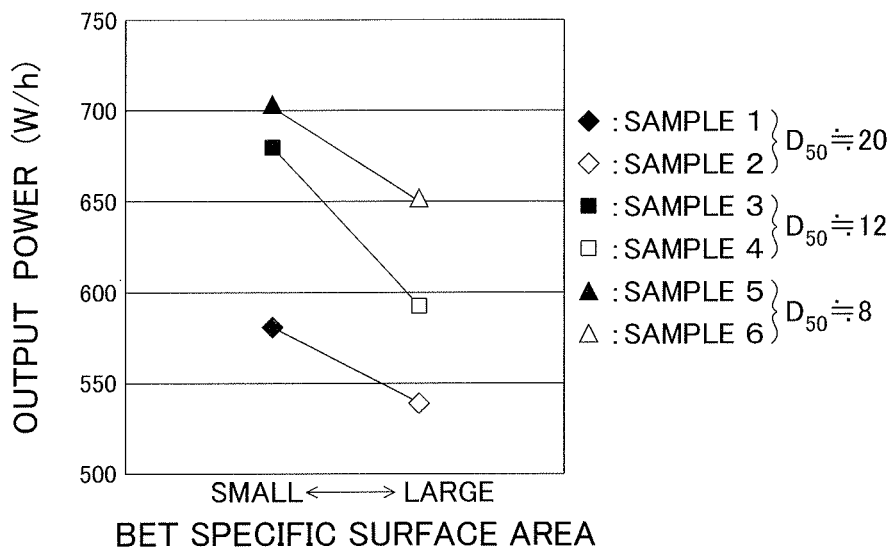
FIG. 1 is a graph showing a relation between BET specific surface area of carbonaceous particles contained in negative electrode active materials of Samples 1 to 6 and output power of nonaqueous electrolyte secondary batteries of Samples 1 to 6 employing the negative electrode active materials.

The negative electrode active material of the present invention comprises $SiO_x$ and carbonaceous particles.

The carbonaceous particles contain graphite. Graphite contributes to absorption and release of a charge carrier together with $SiO_x$ and serves as a negative electrode active material. Furthermore, graphite is expected to serve a function to reduce volume change of $SiO_x$ associated with electric charge and discharge. Moreover, since graphite also has good electric conductivity, graphite sometimes forms part of an electric conductive path in a negative electrode together with a conductive assistant mentioned later. That is to say, graphite combines functions of the negative electrode active material, the volume change reducer, and the conductive assistant in a negative electrode. Graphite can be natural or synthetic. Carbonaceous particles only need to contain graphite as a main component thereof and may contain a material other than graphite. For example, graphite having a coating layer on its surface can be used as carbonaceous particles. The material of the coating layer is not particularly limited but it is preferred to employ a material having good electric conductivity and it is more preferred to employ carbon (C).

The amount of the carbonaceous particles in the negative electrode active material and the content of graphite in the carbonaceous particles can be appropriately determined in accordance with required specifications of a nonaqueous electrolyte secondary battery to be obtained. For example, a larger ratio of $SiO_x$ to the carbonaceous particles is preferred in view of energy density. On the other hand, a smaller ratio of $SiO_x$ to the carbonaceous particles is preferred in order to suppress degradation over time and improve cycle characteristics. In view of these factors, a mass ratio of $SiO_x$ to graphite is preferably about 1:5 to 1:1 and more preferably about 1:3 to 1:1.

There are preferred ranges for a particle diameter and a BET specific surface area of the carbonaceous particles. These ranges will be described later. It should be noted that when carbonaceous particles having a large particle diameter and a small BET specific surface area are employed, there is a merit that a solid content ratio of a negative electrode material (what is called a negative electrode mixture) containing the negative electrode active material can be increased without depending on other materials. It should be noted that a high solid content ratio of the negative electrode mixture has a merit that the amount of a solvent in the negative electrode mixture can be reduced.

As mentioned before, $SiO_x$ is generated by a disproportionation reaction and comprises fine Si and $SiO_2$ covering Si. It is generally said that almost all SiO undergoes disproportionation to be separated into the two phases at 800 deg. C. or more in an oxygen-free atmosphere. Specifically, $SiO_x$ powder including two phases of amorphous $SiO_2$ phase and crystalline Si phase can be obtained by applying heat treatment to raw material silicon oxide powder containing amorphous SiO powder at 800 to 1,200 deg. C. for 1 to 5 hours in an inert atmosphere such as in vacuum or in an inert gas.

The value of x in $SiO_x$ satisfies $0.3 \leq x \leq 1.6$. If x is less than the lower limit value, a ratio of Si to $SiO_2$ is so high that volume change in electric charge and discharge is too great and cycle characteristics deteriorate. On the other hand, if x exceeds the upper limit value, the ratio of Si to $SiO_2$ is so low that energy density decreases. The value of x preferably falls in a range $0.5 \leq x \leq 1.5$, and more preferably in a range $0.7 \leq x \leq 1.2$.

It is preferred that $SiO_x$ has a particle shape, and the diameter of the particles is not particularly limited. Moreover, $SiO_x$ can be primary particles or secondary particles. Moreover, it is desired that $SiO_x$ has an average particle diameter $D_{50}$ in a range of 1 to 10 µm. If the average particle diameter $D_{50}$ of $SiO_x$ is larger than 10 µm, electric charge and discharge characteristics of a nonaqueous electrolyte secondary battery may deteriorate. On the other hand, if the average particle diameter $D_{50}$ is smaller than 1 µm, particles may aggregate to form coarse particles during production of a negative electrode, so charge and discharge characteristics of a nonaqueous electrolyte secondary battery may similarly deteriorate. Furthermore, in view of cycle characteristics of a nonaqueous electrolyte secondary battery, preferably $SiO_x$ has an average particle diameter $D_{50}$ of 3 µm or more, and more preferably has an average particle diameter $D_{50}$ of 4 µm or more. This is because particles having a small particle diameter are brittle. In view of the cycle characteristics and the aforementioned charge and discharge characteristics of a nonaqueous electrolyte secondary battery, it is preferred that $SiO_x$ has an average particle diameter $D_{50}$ in a range from 3 to 8 µm. It should be noted that "an average particle diameter $D_{50}$" is also known as median diameter, and is a particle diameter value when cumulative volume-based undersize particle distribution percentage reaches 50% in particle size distribution data from scattered light intensity distribution (scattering pattern) which has been created after laser irradiation of the particles.

In view of charge and discharge characteristics, it is preferred to employ $SiO_x$ having a large specific surface area. On the other hand, $SiO_x$ having an excessively large specific surface area is not preferred because the amount of a surface coating film (a solid electrolyte interphase; SEI) formed on a surface of $SiO_x$ increases. In view of these two factors, preferably $SiO_x$ has a specific surface area (a BET value; what is called a BET specific surface area) of not less than 2 m²/g and not more than 3.5 m²/g, and more preferably not less than 2.5 m²/g and not more than 3 m²/g.

Moreover, it is preferred that $SiO_x$ has a coating layer comprising a carbon material on a surface thereof. The coating layer comprising the carbon material can render electric conductivity to $SiO_x$. In addition, the coating layer can prevent a reaction between $SiO_x$ and a reactive material which might be contained in an electrolytic solution (e.g., hydrofluoric acid). Therefore, battery characteristics of a nonaqueous electrolyte secondary battery can be improved by forming a coating layer on a surface of $SiO_x$. The carbon material for the coating layer can be generally used ones, and is exemplified by at least one selected from natural graphite, synthetic graphite, coke, mesophase carbon, vapor-grown carbon fiber, pitch-based carbon fiber, and polyacrylonitrile-based carbon fiber. Moreover, it is also possible to form a coating layer by burning a mixture of $SiO_x$ and a carbon material precursor. Preferred examples of the carbon material precursor include organic compounds such as a variety of carbon-containing polymers (sugars, glycols, polypyrrole), and organic compounds capable of being converted into carbon materials by burning such as acetylene black. A coating layer can be formed not only by burning but also by mechanical surface fusion treatment method such as mechanofusion, and vapor deposition process such as CVD, and so on.

The amount of the coating layer formed is preferably 1 to 50% by mass with respect to a total mass of $SiO_x$ and the coating layer. If the amount of the coating layer is less than 1% by mass, it is difficult to obtain an effect to improve electric conductivity. On the other hand, if the amount of the coating layer exceeds 50% by mass, a ratio of $SiO_x$ relatively decreases, so negative electrode capacity lowers. The amount of the coating layer formed is preferably in a range of 5 to 30% by mass and more desirably in a range of 5 to 20% by mass. It should be noted that when a coating layer comprising a carbon material is formed on a surface of $SiO_x$, the carbon material constituting the coating layer is distinguished from graphite as a negative electrode active material.

The negative electrode of the present invention can further contain a conductive assistant, a binder, a dispersant (a surfactant) and so on in addition to the negative electrode active material, that is to say, the aforementioned $SiO_x$ and graphite. These materials for a negative electrode are collectively called a negative electrode mixture. Moreover, the negative electrode active material of the present invention can contain a known negative electrode active material in addition to the aforementioned $SiO_x$ and graphite.

As the conductive assistant, a known material such as acetylene black (AB) and Ketjenblack (trademark) (KB) can be appropriately added and the material of the conductive assistant is not particularly limited. The conductive assistant can further contain a dispersant or the like. The dispersant is a kind of surfactant and an additive for improving dispersion ability of the conductive assistant having a fine particle shape.

The kind of the binder is not limited and can be what is called an organic solvent-based binder or a water-based binder. A binder content in a total mass of the negative electrode mixture is preferably in a range from 8 to 20% by mass. When the binder content is less than 8% by mass, shape formability of a negative electrode lowers. On the other hand, when the binder content is more than 20% by mass, energy density of the negative electrode lowers. In the negative electrode of the present invention, at least part of the binder may be contained in a state modified by heat decomposition.

The negative electrode of the present invention can be produced by preparing a slurry by adding an organic solvent to these materials and mixing them, applying (depositing) the slurry on a current collector by roll coating, dip coating, a doctor blade process, spray coating, curtain coating and other coating methods, and thermosetting the binder.

The current collector of the present invention can be a generally used current collector for a negative electrode for a nonaqueous electrolyte secondary battery. Preferred examples of the current collector include those produced by shaping metals such as Cu and Cu-containing alloys in foil, plates, mesh or other shapes, but the material and shape of the current collector are not particularly limited as long as they meet a purpose.

The nonaqueous electrolyte secondary battery of the present invention employing the aforementioned negative electrode can employ a known positive electrode, a known electrolytic solution, a known separator and so on. Any positive electrode which can be used as a positive electrode for a nonaqueous electrolyte secondary battery can be used in the present invention.

The positive electrode includes a current collector and a positive electrode active material layer bonded to the current collector. The positive electrode active material layer contains a positive electrode active material and a binder, and may further contain a conductive assistant. The positive electrode active material, the conductive assistant and the binder are not particularly limited, and can be anything as long as they can be used in a positive electrode for a nonaqueous electrolyte secondary battery.

As the positive electrode active material, it is possible to employ elemental lithium, S, a composite metal oxide such as those expressed by general formulae $LiCoO_2$, $LiCo_pNi_qMn_rO_2$ (p+q+r=1, 0<p<1, 0≤q<1, 0≤r<1), and $Li_2MnO_2$.

$LiCo_{1/3}Ni_{1/3}Mn_{1/3}O_2$ and $LiCo_{2/10}Ni_{5/10}Mn_{3/10}O_2$ are listed as examples of $LiCo_pNi_qMn_rO_2$ (p+q+r=1, 0<p<1, 0≤q<1, 0≤r<1), and it is particularly preferred to employ $LiCo_{2/10}Ni_{5/10}Mn_{3/10}O_2$.

As the current collector for a positive electrode, it is possible to employ a generally used current collector for a nonaqueous electrolyte secondary battery such as aluminum, nickel, stainless steel, or alloys thereof. As the conductive assistant and the binder for a positive electrode, those described to be used in the abovementioned negative electrode can be used.

As the electrolytic solution, it is possible to use, for example, a solution of a supporting salt (supporting electrolyte) such as lithium salt in an organic solvent. As the organic solvent, it is possible to employ an aprotic organic solvent such as at least one selected from propylene carbonate (PC), ethylene carbonate (EC), dimethyl carbonate (DMC), diethyl carbonate (DEC), ethyl methyl carbonate (EMC), fluoroethylene carbonate (FEC) and so on. In view of cycle characteristics, it is preferred that the organic solvent contains FEC. It is particularly preferred to employ a mixed solution containing FEC, EC, EMC and DMC as the organic solvent. When lithium salt is employed as the supporting salt (the supporting electrolyte), it is possible to employ lithium salt which is soluble in an organic solvent, such as $LiPF_6$, $LiBF_4$, $LiAsF_6$, LiI, $LiClO_4$, and $LiCF_3SO_3$. Preferred concentration of the supporting salt is not particularly limited, but it is possible to employ a solution of lithium salt in a concentration of about 0.5 to 1.7 mol/L in the aforementioned organic solvent (or the mixed solution of the organic solvents).

The kind of the separator is not particularly limited and a known separator for a nonaqueous electrolyte secondary battery can be used in the present invention. The separator serves to separate the positive electrode and the negative electrode and hold the electrolytic solution, and can be constituted by a thin microporous film of polyethylene, polypropylene or the like. It should be noted that there are some cases in which no separator is necessary depending on the kind of nonaqueous electrolyte secondary batteries. For example, no separator is necessary when the nonaqueous electrolyte secondary battery is a solid electrolyte secondary battery.

Shape of the nonaqueous electrolyte secondary battery of the present invention is not particularly limited and can be selected from a variety of shapes including a cylindrical shape, a multi-layered shape, and a coin shape. Even when the nonaqueous electrolyte secondary battery of the present invention takes any shape, an electrode assembly is formed by sandwiching the separator with the positive electrode and the negative electrode. Then, the positive electrode current collector and a positive electrode external connection terminal, and the negative electrode current collector and a negative electrode external connection terminal are respectively connected with current collecting leads or the like. Then this electrode assembly is sealed in a battery casing together with an electrolytic solution, thereby forming a battery. Furthermore, the nonaqueous electrolyte secondary battery of the present invention is not limited to the abovementioned lithium ion secondary battery, and can be applied to lithium polymer secondary batteries, sodium ion batteries, sodium polymer secondary batteries, electric double layer capacitors, and the like.

DETAILED DESCRIPTION OF PREFERRED EMBODIMENTS

Hereinafter, the present invention will be described in more detail by way of test samples. It should be noted that nonaqueous electrolyte secondary batteries of the following test samples were lithium ion secondary batteries.

Sample 1

<Negative Electrode Active Material and Negative Electrode>

First, commercially available SiO powder was loaded into a ball mill and milled at 450 rpm in an Ar atmosphere for 20 hours. Then, the SiO powder was subjected to heat treatment at 900 deg. C. in an inert gas atmosphere for 2 hours. Thus the SiO powder underwent disproportionation to form silicon oxide ($SiO_x$) having a particle shape. An X-ray diffraction (XRD) analysis of this $SiO_x$ powder using CuKα radiation showed characteristic peaks derived from elemental silicon and silicon dioxide. This demonstrates that elemental silicon and silicon dioxide were generated in $SiO_x$, that is to say, $SiO_x$ are disproportionation products. $SiO_x$ had an average particle diameter $D_{50}$ of 4.4 μm.

The disproportionation products $SiO_x$, carbonaceous particles, acetylene black (AB) as a conductive assistant, and polyamideimide (PAI) as a binder were mixed and a solvent was added to the mixture, thereby obtaining a negative electrode mixture in a form of slurry. Specifically speaking, the carbonaceous particles employed were particles of natural graphite having a carbon coating layer on a surface thereof. These carbonaceous particles had a BET specific surface area of 2.11 $m^2/g$ and an average particle diameter ($D_{50}$) of 19.2 μm. The solvent employed was N-methyl-2-pyrrolidone (NMP). The $SiO_x$, the carbonaceous particles, the conductive assistant, and the binder had a mass ratio of $SiO_x$:carbonaceous particles:AB:PAI=32:50:8:10. It should be noted that the $SiO_x$ and the carbonaceous particles constitute the negative electrode active material.

Next, the negative electrode mixture in the form of slurry was deposited on one surface of copper foil as a current collector by using a doctor blade. The weight of the coated slurry per unit area of the current collector was 7.75 $mg/cm^2$. At this time, the negative electrode mixture had a density of 1.6 $g/cm^3$. The negative electrode mixture together with the current collector was pressed and burned. Burning temperature was 200 deg. C. and burning time was 2 hours. By the abovementioned processes, a negative electrode in which a negative electrode material layer was fixed on a surface of the current collector for a negative electrode was obtained.

By the way, polyamideimide, which is an organic solvent-based binder, was employed in the negative electrode of the present sample. However, the binder used for the negative electrode of the present invention can be based on an organic solvent or water.

Examples of the organic solvent-based binder include polyvinylidene difluoride (PVDF) and polytetrafluoroethylene (PTFE) in addition to the aforementioned polyamideimide. These binders can be employed singly or in a combination of two or more.

Examples of the water-based binder include polyacrylate, ethylene vinyl alcohol, carboxymethyl cellulose (CMC), sodium polyacrylate, styrene-butadiene copolymer (SBR), and polyurethane. These binders can be employed singly or in a combination of two or more.

It is particularly preferred to select an organic solvent-based binder as the binder. This is because organic solvent-based binders were used in the negative electrode of Sample 1 and those of the following Samples 2 to 6.

<Positive Electrode>

Employed were $LiCo_{0.2}Ni_{0.5}Mn_{0.3}O_2$ as a positive electrode active material, acetylene black (AB) as a conductive assistant, and polyvinylidene difluoride (PVDF) as a binder. $LiCo_{2/10}Ni_{5/10}Mn_{3/10}O_2$, the conductive assistant, and the binder had a mass ratio of $LiCO_{2/10}Ni_{5/10}Mn_{3/10}O_2$:AB: PVDF=94:3:3. $LiCo_{2/10}Ni_{5/10}Mn_{3/10}O_2$, AB, and PVDF were mixed, thereby obtaining a positive electrode mixture in a form of slurry. The obtained positive electrode mixture in the form of slurry was applied on one surface of aluminum foil as a current collector. The weight of the coated slurry per unit area of the current collector was 30 mg/cm². At this time, the positive electrode mixture had a density of 3.2 g/cm³. Then, the positive electrode mixture together with the current collector was pressed and burned. Burning temperature was 120 deg. C. and burning time was 2 hours. By the foregoing processes, a positive electrode in which a positive electrode active material layer was fixed on a surface of the current collector for a positive electrode was obtained.

<Nonaqueous Electrolyte Secondary Battery>

A separator was sandwiched between the positive electrode and the negative electrode. The separator used was a porous polypropylene film. A plurality of electrode assemblies each comprising the positive electrode, the separator and the negative electrode were laminated. Peripheries of two aluminum films except one part were fusion-bonded to make a bag-shaped casing. The laminated electrode assemblies were placed and then an electrolytic solution was further poured into the aluminum film casing.

The electrolytic solution was a solution of $LiPF_6$ as a supporting electrolyte and LPFO as an additive in an organic solvent. The organic solvent was a mixture of fluoroethylene carbonate (FEC), ethylene carbonate (EC), ethyl methyl carbonate (EMC) and dimethyl carbonate (DMC). FEC, EC, EMC and DMC had a volume ratio of EFC:EC:EMC: DMC=4:26:30:40. A concentration of $LiPF_6$ in the electrolytic solution was 1 mol/L (namely, 1 M), and a concentration of LPFO in the electrolytic solution was 0.005 mol/L (=5 μmol/mL). The electrolytic solution contained in one battery had a volume of 0.3 mL.

Then, while the casing was vacuumed, an opening portion of the aluminum film casing was sealed airtight. At this time, ends of the positive electrode current collector and the negative electrode current collector were protruded from the peripheral portions of the film casing so as to be connectable to external terminals. By the foregoing processes, a nonaqueous electrolyte secondary battery of Sample 1 was obtained. Then the nonaqueous electrolyte secondary battery of Sample 1 was conditioned.

Sample 2

A negative electrode active material of Sample 2 was the same as that of Sample 1, except that carbonaceous particles had a different average particle diameter $D_{50}$ and a different BET specific surface area from those of Sample 1. In the negative electrode active material of Sample 2, the carbonaceous particles had an average particle diameter $D_{50}$ of 19.8 μm and a BET specific surface area of 3.82 m²/g.

A negative electrode and a nonaqueous electrolyte secondary battery of Sample 2 were produced by the same method as in Sample 1, except that the negative electrode active material of Sample 2 was employed.

Sample 3

A negative electrode active material of Sample 3 was the same as that of Sample 1, except that carbonaceous particles had a different average particle diameter $D_{50}$ and a different BET specific surface area from those of Sample 1. In the negative electrode active material of Sample 3, the carbonaceous particles had an average particle diameter $D_{50}$ of 12.0 μm and a BET specific surface area of 2.40 m²/g.

A negative electrode and a nonaqueous electrolyte secondary battery of Sample 3 were produced by the same method as in Sample 1, except that the negative electrode active material of Sample 3 was employed.

Sample 4

A negative electrode active material of Sample 4 was the same as that of Sample 1, except that carbonaceous particles had a different average particle diameter $D_{50}$ and a different BET specific surface area from those of Sample 1. In the negative electrode active material of Sample 4, the carbonaceous particles had an average particle diameter $D_{50}$ of 12.2 μm and a BET specific surface area of 3.16 m²/g.

A negative electrode and a nonaqueous electrolyte secondary battery of Sample 4 were produced by the same method as in Sample 1, except that the negative electrode active material of Sample 4 was employed.

Sample 5

A negative electrode active material of Sample 5 was the same as that of Sample 1, except that carbonaceous particles had a different average particle diameter $D_{50}$ and a different BET specific surface area from those of Sample 1. In the negative electrode active material of Sample 5, the carbonaceous particles had an average particle diameter $D_{50}$ of 8.8 μm and a BET specific surface area of 3.30 m²/g.

A negative electrode and a nonaqueous electrolyte secondary battery of Sample 5 were produced by the same method as in Sample 1, except that the negative electrode active material of Sample 5 was employed.

Sample 6

A negative electrode active material of Sample 6 was the same as that of Sample 1, except that carbonaceous particles had a different average particle diameter $D_{50}$ and a different BET specific surface area from those of Sample 1. In the negative electrode active material of Sample 6, the carbonaceous particles had an average particle diameter of $D_{50}$ of 8.5 μm and a BET specific surface area of 5.80 m²/g.

A negative electrode and a nonaqueous electrolyte secondary battery of Sample 6 were produced by the same method as in Sample 1, except that the negative electrode active material of Sample 6 was employed.

Evaluation Test

Figure 2:
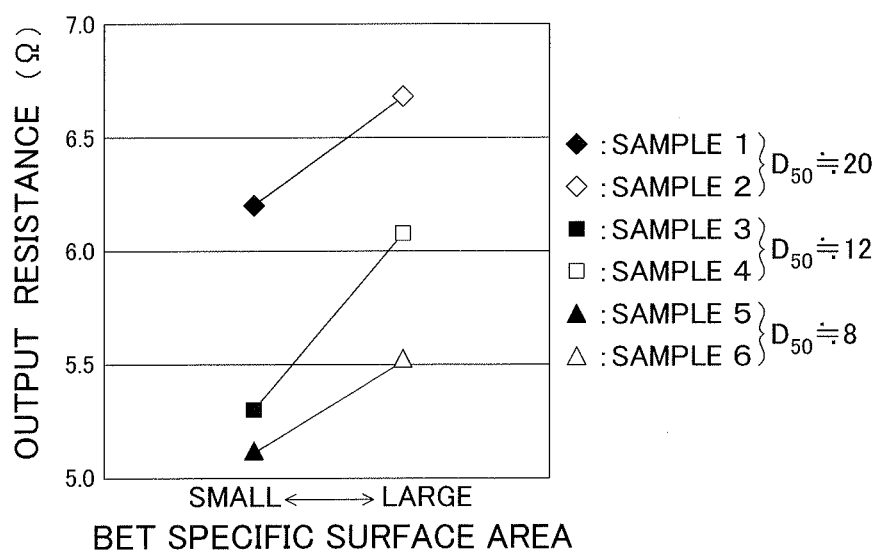
FIG. 2 is a graph showing a relation between the BET specific surface area of the carbonaceous particles contained in the negative electrode active materials of Samples 1 to 6 and output resistance of the nonaqueous electrolyte secondary batteries of Samples 1 to 6 employing the negative electrode active materials.

The nonaqueous electrolyte secondary batteries of Samples 1 to 6 were electrically charged and discharged to a final charge voltage of 4.2 V and to a final discharge voltage of 3 V at a current density of 16 mA per 1 cm² of each of the negative electrode active materials at a temperature of 25 deg. C., and output power (W/h) of the nonaqueous electrolyte secondary batteries was measured. At this time, output resistance of the nonaqueous electrolyte secondary batteries was also measured. The output power and the output resistance of the nonaqueous electrolyte secondary batteries of Samples 1 to 6 measured are shown in Table 1, FIGS. 1 and 2. It should be noted that $D_{50}$ and BET value in Table 1 are average particle diameter $D_{50}$ and BET specific surface area of the carbonaceous particles, respectively. FIG. 1 is a graph showing a relation between BET specific surface area of the carbonaceous particles of the negative electrode active materials used in the respective nonaqueous electrolyte secondary batteries of Samples 1 to 6 and output power of the respective nonaqueous electrolyte secondary batteries. FIG. 2 is a graph between BET specific surface area of the carbonaceous particles of the negative electrode active materials used in the respective nonaqueous electrolyte secondary batteries of Samples 1 to 6 and output resistance of the respective nonaqueous electrolyte secondary batteries.

TABLE 1

|  | SAMPLE 1 | SAMPLE 2 | SAMPLE 3 | SAMPLE 4 | SAMPLE 5 | SAMPLE 6 |
| --- | --- | --- | --- | --- | --- | --- |
| $D_{50}$ (μm) | 19.2 | 19.8 | 12.0 | 12.2 | 8.8 | 8.5 |
| BET VALUE (m$^2$/g) | 2.11 | 3.82 | 2.40 | 3.16 | 3.30 | 5.80 |
| RESISTANCE (Ω) | 6.20 | 6.68 | 5.30 | 6.08 | 5.12 | 5.53 |
| OUTPUT POWER (W/h) | 581 | 539 | 680 | 593 | 703 | 652 |

As shown in FIG. 1, the nonaqueous electrolyte secondary batteries employing the carbonaceous particles having relatively small BET specific surface area (Samples 1, 3, and 5) tended to have larger output power than the nonaqueous electrolyte secondary batteries employing the carbonaceous particles having relatively large BET specific surface area (Samples 2, 4 and 6). Moreover, the nonaqueous electrolyte secondary batteries employing the carbonaceous particles having relatively small average particle diameter $D_{50}$ (Samples 3, 4, 5 and 6) tended to have larger output power than the nonaqueous electrolyte secondary batteries employing the carbonaceous particles having relatively large average particle diameter $D_{50}$ (Samples 1 and 2). The output power was larger in the order of Sample 5>Sample 3>Sample 6>Sample 4>Sample 1>Sample 2.

Moreover, as shown in FIG. 2, the nonaqueous electrolyte secondary batteries employing the carbonaceous particles having relatively small BET specific surface area (Samples 1, 3 and 5) tended to have smaller output resistance than the nonaqueous electrolyte secondary batteries employing the carbonaceous particles having relatively large BET specific surface area (Samples 2, 4 and 6). Furthermore, the nonaqueous electrolyte secondary batteries employing the carbonaceous particles having relatively small average particle diameter $D_{50}$ (Samples 3, 4, 5 and 6) tended to have smaller output resistance than the nonaqueous electrolyte secondary batteries employing the carbonaceous particles having relatively large average particle diameter $D_{50}$ (Samples 1 and 2). The output resistance was smaller in the order of Sample 5<Sample 3<Sample 6<Sample 4<Sample 1<Sample 2. It is apparent from these results that the samples are more preferred in the order of Sample 5>Sample 3>Sample 6>Sample 4>Sample 1>Sample 2 both in view of output power (i.e., discharge capacity) and in view of output resistance (i.e., electric conductivity).

Figure 3:
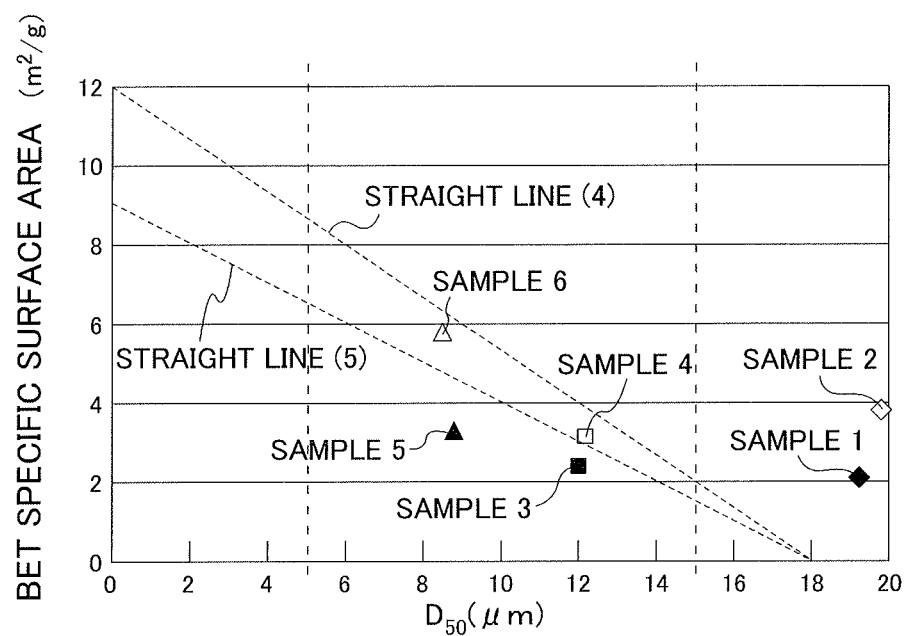
FIG. 3 is a graph showing a preferred relation between BET specific surface area and average particle diameter ($D_{50}$) of carbonaceous particles calculated based on the output power and the output resistance of the nonaqueous electrolyte secondary batteries of Samples 1 to 6.

The nonaqueous electrolyte secondary batteries of Samples 1 to 6 are classified based on the above results into two groups in terms of output power and output resistance. One group is a favorable group and the other is an unfavorable group in view of output power and output resistance. The favorable group is comprised of Samples 5, 3, 6 and 4, and the unfavorable group is comprised of Samples 1 and 2. It should be noted that in FIG. 3, the vertical axis represents BET specific surface area (m$^2$/g) of carbonaceous particles and the horizontal axis represents average particle diameter $D_{50}$ (μm) of the carbonaceous particles. A straight line (4) dividing the favorable group and the unfavorable group is drawn in the graph shown in FIG. 3. This straight line (4) is expressed by $\beta=-(12/18)\alpha+12$. In this equation, $\alpha$ denotes average particle diameter $D_{50}$ of the carbonaceous particles, and $\beta$ denotes BET specific surface area of the carbonaceous particles. The favorable group is located below the straight line (4). That is to say, carbonaceous particles satisfying the following Formula (1) belong to the aforementioned favorable group.

$$\beta \leq -(12/18)\alpha+12 \quad (1)$$

By the way, carbonaceous particles having a smaller average particle diameter $D_{50}$ are more preferred as mentioned before. Also in the graph shown in FIG. 3, the carbonaceous particles of Samples 1 and 2 having a relatively large average particle diameter $D_{50}$ of about 20 μm belong to the unfavorable group. On the other hand, the carbonaceous particles of Samples 3 and 4 having an average particle diameter $D_{50}$ of about 12 μm belong to the favorable group. From these facts, the average particle diameter $D_{50}$ of less than 20 μm is considered good, and specifically speaking the average particle diameter $D_{50}$ of not more than a value in a range between 20 and 12 μm, more specifically, not more than 15 μm is considered good. On the other hand, in view of production technique for carbonaceous particles, it is difficult to produce carbonaceous particles having an average particle diameter $D_{50}$ of 5 μm or less. Therefore, it is considered good that the average particle diameter $D_{50}$ of carbonaceous particles falls in a range expressed by Formula (2). Accordingly, capacity enhancement and an improvement in electric conductivity of a nonaqueous electrolyte secondary battery can be attained by employing carbonaceous particles having $\alpha$ and $\beta$ which satisfy the above Formula (1) and the following Formula (2).

$$5 \leq \alpha \leq 15 \quad (2)$$

Moreover, the abovementioned favorable group is further divided into two groups. One subgroup is a particularly preferred group and the other is a just preferred group. The particularly preferred group is comprised of Samples 5 and 3. A straight line (5) dividing the particularly preferred group and the other groups is drawn in the graph shown in FIG. 3. This straight line (5) is expressed by $\beta=-(9/18)\alpha+9$. The particularly preferred group is located below the straight line (5) in FIG. 3. That is to say, carbonaceous particles having $\alpha$ and $\beta$ which satisfy the following Formula (3) belong to the aforementioned particularly preferred group. Accordingly, further capacity enhancement and a further improvement in electric conductivity of a nonaqueous electrolyte secondary battery can be attained by employing carbonaceous particles having $\alpha$ and $\beta$ which satisfy both the following Formula (3) and the above Formula (2).

$$\beta \leq -(9/18)\alpha+9 \quad (3)$$

Others

The present invention is not limited to the preferred embodiments described above and illustrated in the drawings. Many modification of the present invention are possible without departing from the spirit of the present invention.

What is claimed is:

1. A negative electrode, comprising:
   a negative electrode active material containing a silicon oxide expressed by $SiO_x$, where $0.3 \leq x < 1$, and carbonaceous particles containing graphite,
   a conductive agent selected from acetylene black or ketjenblack, and
   a binder,
   wherein when the carbonaceous particles have an average particle diameter $D_{50}$ of $\alpha$ (μm) and a BET specific surface area of $\beta$ (m$^2$/g), the $\alpha$ and the $\beta$ satisfying the following Formulae (3) and (2), wherein the $\alpha$ and $\beta$ used in the following Formulae (3) and (2) are numerals:

$$\beta \leq -(9/18)\alpha + 9 \quad (3)$$

$$5 \leq \alpha \leq 15 \quad (2),$$

wherein a mass ratio of $SiO_x$ to graphite is 1:3 to 1:2,
   wherein a content of the binder is 8-20% by mass in the case when a total mass of the negative electrode material is 100% by mass, and
   wherein the carbonaceous particles comprise a graphite core and a carbon coating layer.

2. A nonaqueous electrolyte secondary battery having the negative electrode according to claim 1.

3. The negative electrode according to claim 1, wherein the coating of the carbonaceous particles is a material having electrical conductivity.

4. The negative electrode according to claim 1, wherein the $SiO_x$ has a coating layer comprising a carbon material on a surface thereof.

5. The negative electrode according to claim 4, wherein the carbon material of the coating layer of the $SiO_x$ is selected from the group consisting of graphite, synthetic graphite, coke, mesophase carbon, vapor-grown carbon fiber, pitch-based carbon fiber, and polyacrylonitrile-based carbon fiber.

6. The negative electrode according to claim 4, wherein the coating layer of the $SiO_x$ is formed in a range of 5 to 30% by mass based on the total mass of the $SiO_x$.

7. The negative electrode according to claim 1, wherein the $SiO_x$ has a BET specific surface area of 2 to 3.5 m$^2$/g.

8. The negative electrode according to claim 3, wherein the $SiO_x$ has a coating layer comprising a carbon material on a surface thereof.

9. The negative electrode according to claim 8, wherein the coating layer of the $SiO_x$ is formed in a range of 5 to 30% by mass based on the total mass of the $SiO_x$.

10. The negative electrode according to claim 1, further comprising a surfactant.

11. The negative electrode according to claim 1, wherein the binder is selected from the group consisting of polyamideimide, polyvinylidene difluoride, and polytetrafluoroethylene.

12. The negative electrode according to claim 11, wherein
    the coating of the carbonaceous particles is a material having electrical conductivity,
    the $SiO_x$ has a coating layer comprising a carbon material on a surface thereof,
    the carbon material of the coating layer of the $SiO_x$ is selected from the group consisting of graphite, synthetic graphite, coke, mesophase carbon, vapor-grown carbon fiber, pitch-based carbon fiber, and polyacrylonitrile-based carbon fiber,
    the coating layer of the $SiO_x$ is formed in a range of 5 to 30% by mass based on the total mass of the $SiO_x$, and
    the $SiO_x$ has a BET specific surface area of 2 to 3.5 m$^2$/g.

* * * * *